March 24, 1959 W. A. SPENCER 2,878,998
COIN CONTROLLED BARRIER GATE MECHANISM FOR VEHICLES
Filed April 21, 1953 4 Sheets-Sheet 1

Inventor:
William A. Spencer

March 24, 1959 W. A. SPENCER 2,878,998
COIN CONTROLLED BARRIER GATE MECHANISM FOR VEHICLES
Filed April 21, 1953 4 Sheets-Sheet 2

Inventor
William A Spencer
By: Fred Gerlach
Attorney

March 24, 1959  W. A. SPENCER  2,878,998
COIN CONTROLLED BARRIER GATE MECHANISM FOR VEHICLES
Filed April 21, 1953  4 Sheets-Sheet 3
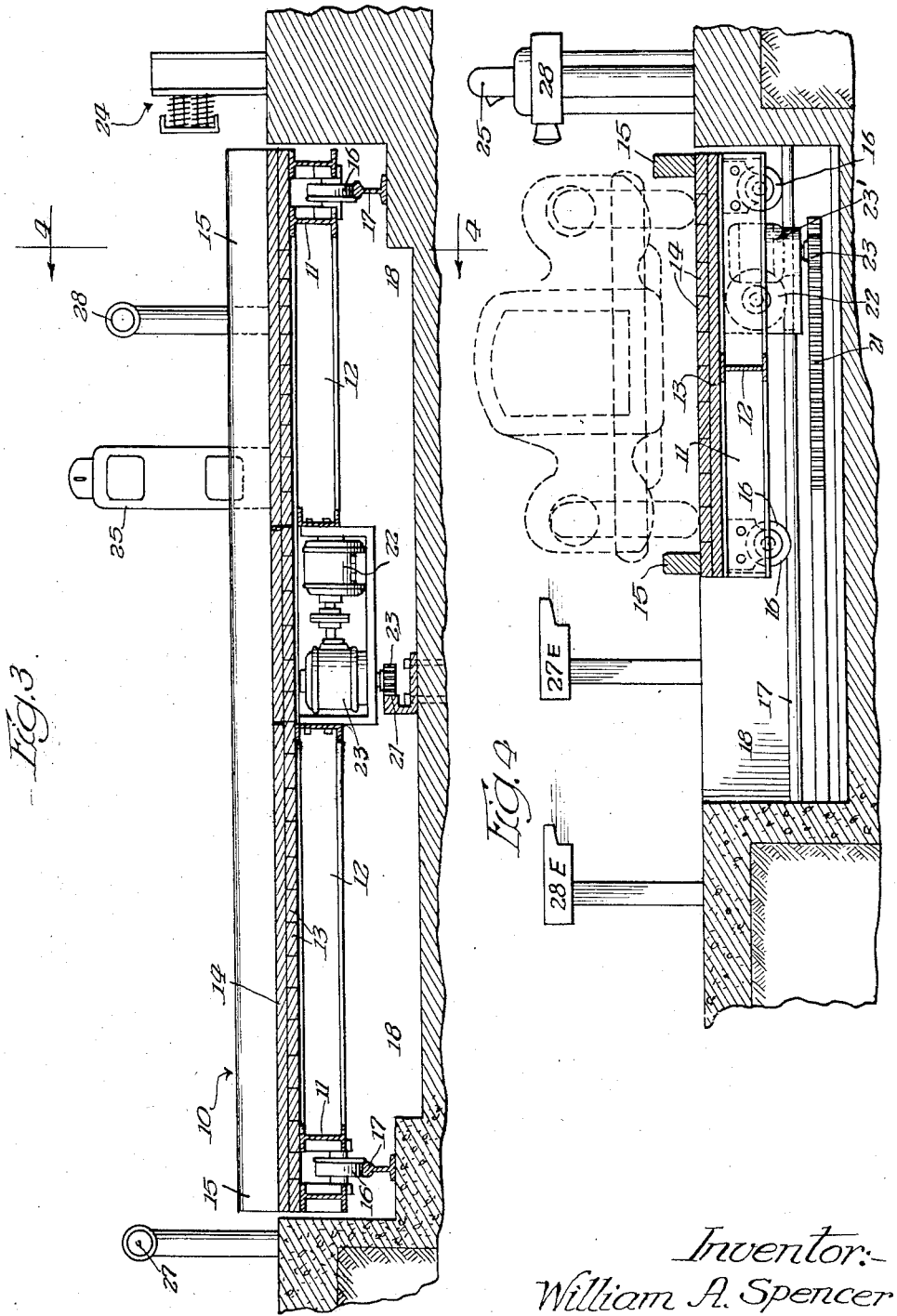
Inventor:—
William A. Spencer
By:— Fred Gerlach
Attorney.

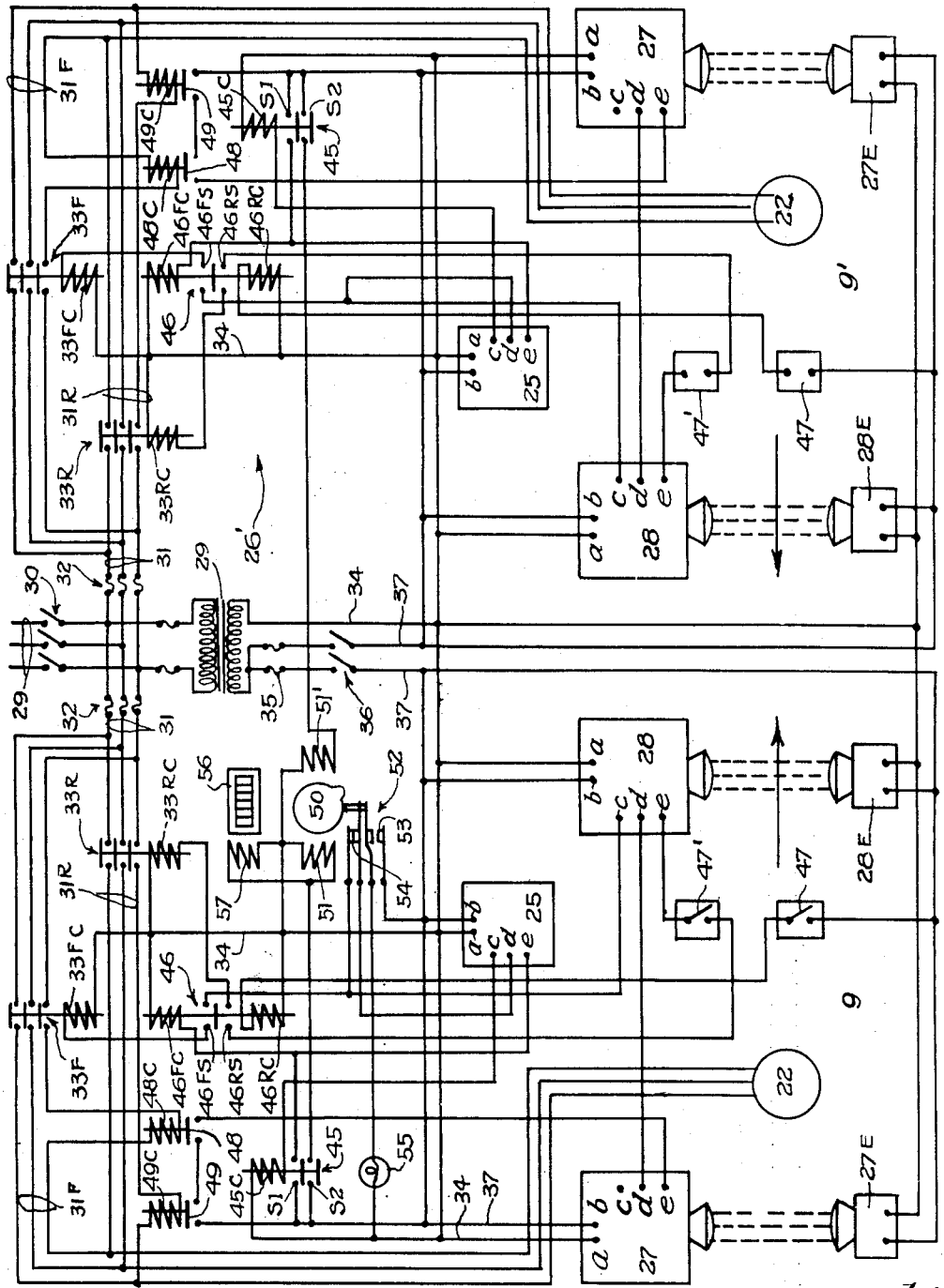

United States Patent Office 2,878,998
Patented Mar. 24, 1959

2,878,998

COIN CONTROLLED BARRIER GATE MECHANISM FOR VEHICLES

William A. Spencer, Chicago, Ill.

Application April 21, 1953, Serial No. 350,029

1 Claim. (Cl. 235—99)

The present invention relates, in general, to money collection, and has more particular reference to the collection of money paid for the admission of a vehicle, or other entity, to or removal thereof from an enclosed or otherwise delimited zone or area, the invention pertaining specifically to improved means for and method of collecting fees paid for the storage of vehicles in parking areas.

An important object is to provide a vehicle gate mechanism normally conditioned to receive and halt or entrap a vehicle or other entity in predetermined position therein, and including means operable when such trapped entity is in halted position in the mechanism to condition the same to release the entity for delivery from the mechanism; a further object being to provide for such entity releasing action of the mechanism in response to the deposit of coins paid as a fee to obtain passage of the entity through the gate mechanism.

Another important object of the invention is to provide improved means for the coin box collection of money charged for vehicular use of facilities, such as parking lot, toll bridge or toll road facilities, requiring vehicle entrance into or exit from a defined zone or area; a further object being to provide normally closed entrance or exit gate mechanism, or combination entrance and exit gate mechanisms communicating with said zone and operable in response to the deposit of coins in suitable coin receiving apparatus to allow passage of a vehicle to or from the zone through such gate mechanisms.

Another important object is to provide vehicle gate mechanism comprising a relatively shiftable carriage adapted normally to be presented in position to receive a vehicle delivered thereon in one direction, as over an entrance ramp, and to halt advancing movement of the vehicle in such direction to thus trap the vehicle in the mechanism when the carriage is in vehicle receiving position, including means, operable when a vehicle is thus entrapped on the carriage, for shifting the carriage to a position in which a vehicle thereon is free for delivery therefrom, as over a discharge ramp; a further object being to provide coin actuated means for shifting the carriage from vehicle receiving to vehicle delivering position in response to the deposit of coins representing a required fee for the passage of the vehicle through the gate mechanism.

Another important object is to provide for the automatic return of the carriage to vehicle receiving position as the result of delivery of a vehicle from the carriage over the delivery ramp.

Another important object is to provide means for disabling the equipment and for rejecting and returning coins deposited therein except when a vehicle is in a predetermined halted position upon the carriage.

Another important object is to provide means for preventing carriage shifting movement from vehicle receiving to vehicle delivery position, while a vehicle is being delivered upon the carriage or in the event that delivery of a vehicle over the entrance ramp onto the carriage be attempted while a previously delivered vehicle is on the carriage.

Another important object is to provide means for preventing delivery of a vehicle over the entrance ramp onto the carriage, while a previously delivered vehicle is on the carriage, or when the carriage is in position relatively shifted from its normal vehicle receiving position.

Another important object is to utilize vehicle gate mechanism of the character mentioned in order to control the entrance, or exit, or both entrance and exit, of vehicles to or from a restricted or delimited zone or area, such as a vehicle parking lot, or a toll highway or bridge, or like zone or area in connection with which a fee is charged either for vehicle entrance thereto, or exit therefrom, or both, thereby providing for the automatic collection of fees for entrance to or exit from such zone, without requiring the presence of fee collecting personnel.

Another important object is to provide counting mechanism in connection with vehicle entrance and exit gate apparatus of the character mentioned, including means controlled by the counter mechanism for disabling the associated entrance gate apparatus when the zone guarded thereby contains a predetermined maximum number of vehicles; a further object being to provide progressively operable counter means adapted to progressively increase the count registered thereby as vehicles are delivered through the entrance gate apparatus and to progressively decrease said count as vehicles are withdrawn from the guarded zone area, or parking lot, through the exit gate; a still further object being to disable the entrance gate mechanism when the counter means shows that the guarded zone contains such predetermined maximum number of vehicles.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Figure 6:
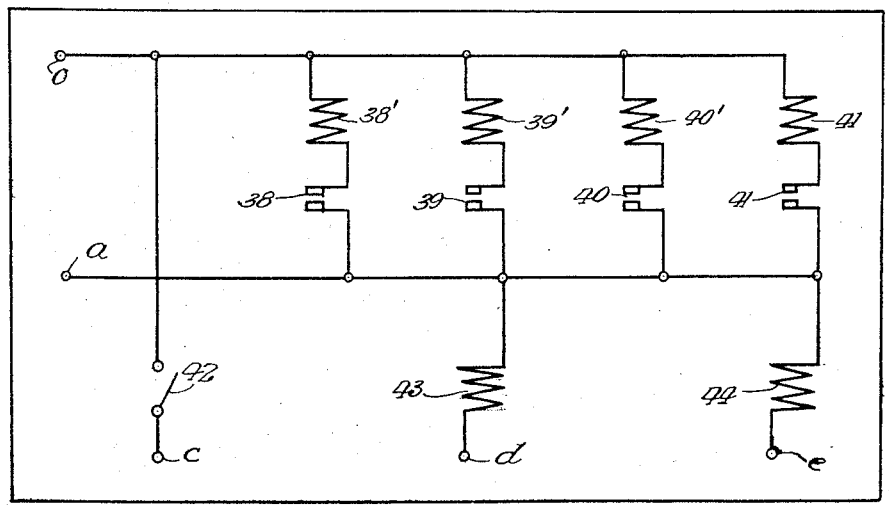
Figure 2:
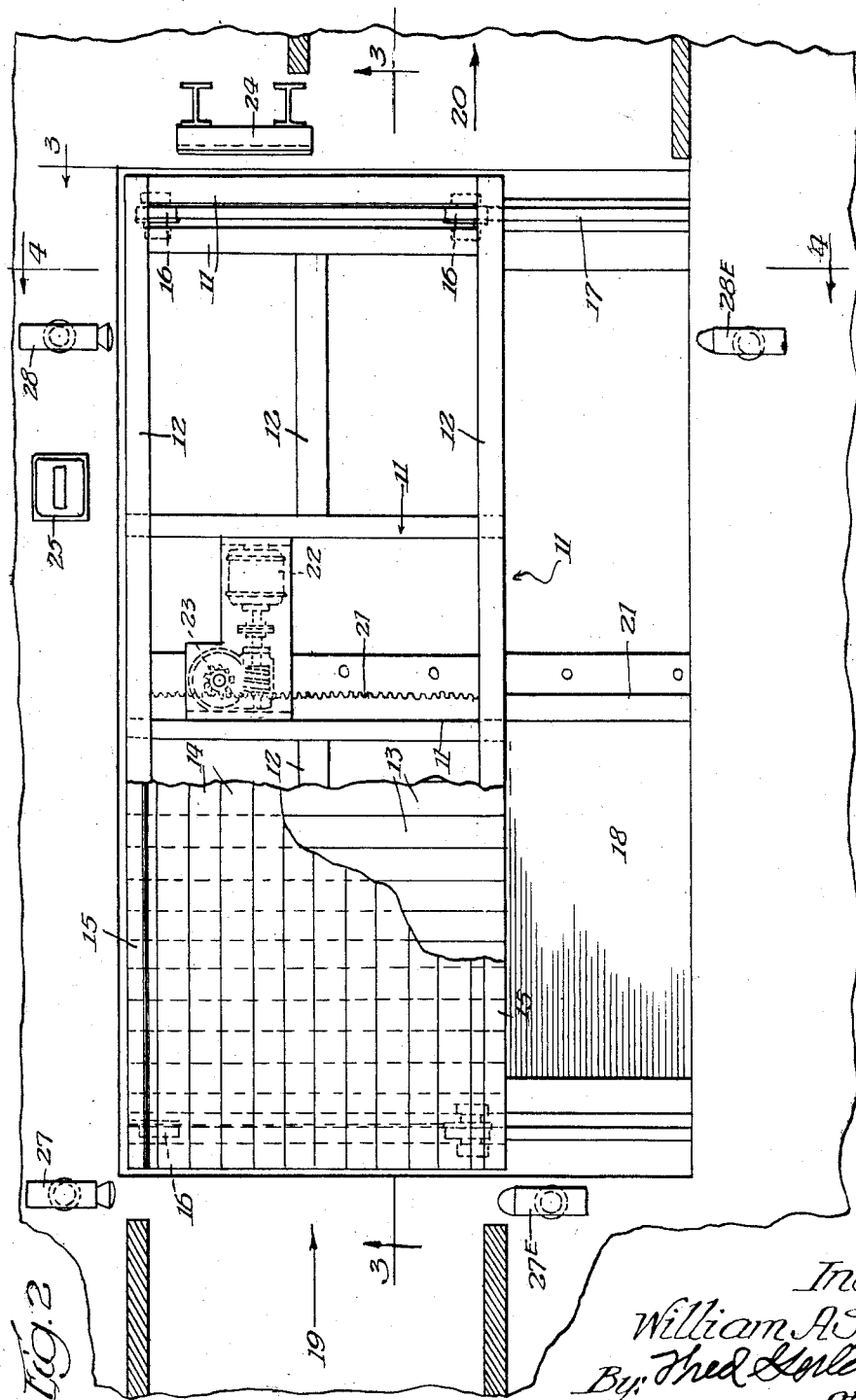
Figure 2 is a diagrammatic sketch showing gate mechanism embodying the present invention.

Figures 3 and 4 are sectional views respectively taken substantially along the lines 3—3 and 4—4 in Figure 2;

Figure 5 is a diagram of electrical connections required for operating a pair of gate mechanisms respectively provided for controlling vehicle entry to and exit from a restricted zone, such as a parking lot; and Figure 6 is a diagrammatic showing of electrical coin collecting apparatus forming part of the arrangement shown in Figure 5.

To illustrate the invention, the drawings show vehicle gate mechanism for controlling the entrance of vehicles to, or exit thereof from a restricted or delimited zone or area, such as a parking lot, toll road or toll bridge, for entrance to or exit from which it may be desired to charge a fee, the gate mechanism being arranged and disposed so that entrance of a vehicle into or exit thereof from the zone or area may be accomplished only through such gate mechanism. The gate mechanism provides means normally barring the passage of a vehicle therethrough, and means operable after a vehicle has been delivered into the gate mechanism to condition the same to permit the vehicle to be delivered therethrough.

Figure 1:
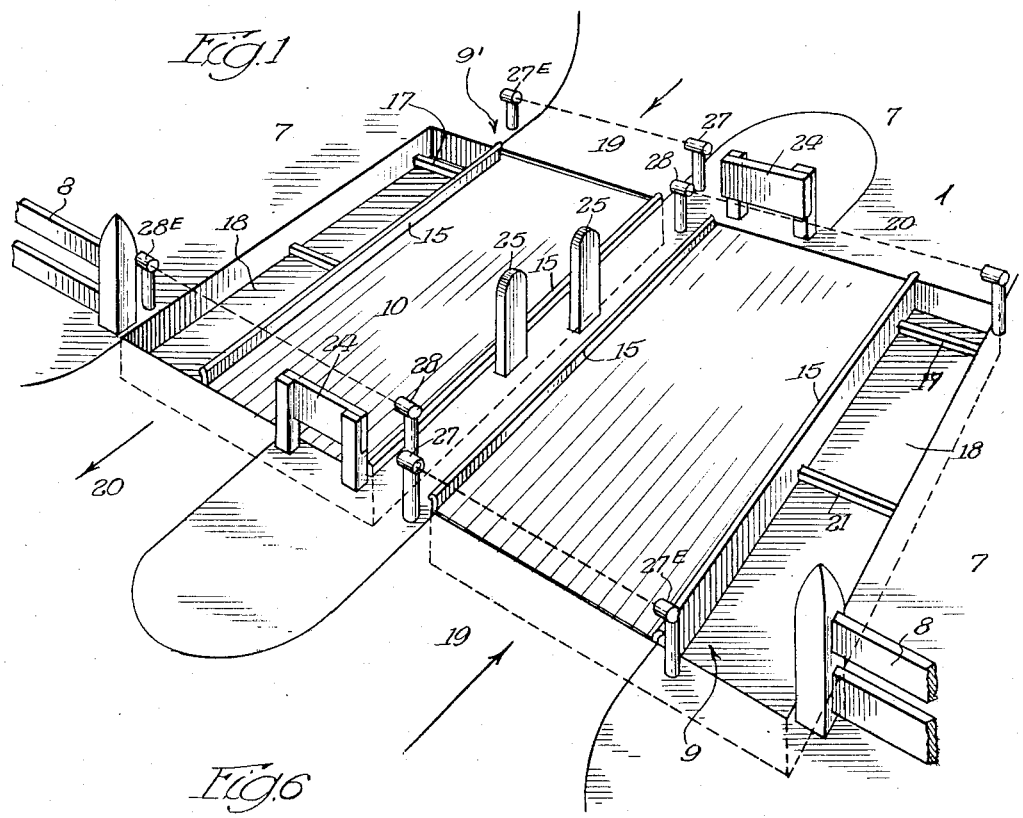
Figure 1 is a perspective view of entrance and exit gate mechanism embodying the invention as applied to guard a vehicle parking lot or area.

As shown more particularly in Figure 1, a delimited zone 7, such as a parking lot, may be defined and guarded by fence means 8, in conjunction with entrance gate mechanism 9 and an exit gate mechanism 9', respectively affording vehicle access to and removal from the zone. The entrance and exit gate mechanisms may be of identical construction, and each may consist of a carriage 10, providing a vehicle supporting platform. The carriage of each gate mechanism is preferably sized to receive the vehicle to be accommodated. The carriage, accordingly, may be of longitudinally elongated generally rectangular configuration, and of sufficient length and width to snugly receive the vehicle. Each carriage may conveniently comprise transverse and longitudinal beams 11 and 12, suitably interconnected to form a carriage frame, and flooring, such as transverse and longitudinally extending boards 13 and 14 forming a vehicle receiving platform 10 on the frame. Spaced apart retaining curbs 15 may be provided along the opposite sides of the platform. The carriage also may be provided with supporting wheels 16, as at the corners of its frame, whereby to shiftably support the carriage for movement as on wheel engaging rails 17.

Each carriage 10 may be and preferably is set up for operation in a corresponding pit 18 formed at the place of installation of the gate mechanism. The pits 18 may be sized each snugly to receive the opposite ends of its corresponding carriage, the rails 17 being disposed to permit the carriages to be shifted, each in its containing pit, between vehicle receiving and vehicle discharging positions. When in said positions the platform 10 will be presented in alinement respectively with entrance and exit ramps 19 and 20 over which a vehicle has to move in being delivered onto and removed from the platforms. Obviously the carriages 11 may be mounted on rails laid on the surface of the ground, or even on suitable support structures above ground level, providing suitable inclined entrance and exit ramps be supplied so that vehicles may be driven upon and from the carriages.

While the invention specifically contemplates the possibility of forming and mounting each carriage as a turntable movable between angularly shifted vehicle receiving and discharging positions, the illustrated embodiment shows laterally shiftable carriages movable between laterally offset vehicle receiving and delivering positions.

Any suitable, preferred, or convenient means may be provided for shifting the carriages 10 each from a vehicle receiving position, in alinement with its entrance ramp 19, to a vehicle discharging position, in alinement with its exit ramp 20. As shown, a rack bar 21 may be secured in each pin 18 in position extending beneath the medial portions of the carriage 11 therein. The carriage, in turn, may be provided with a mounting for supporting a pinion 23 turnably on the carriage in position drivingly to engage the rack 21. Suitable means may be provided for driving the pinion in one direction or the other in order thus to shift the carriage on which it is mounted from vehicle receiving to vehicle discharging position, and vice versa.

In order to drive the carriages between vehicle receiving and discharging positions, an electric motor 22 may be mounted on the frame of each carriage 10. Each motor 22 may be connected with its corresponding pinion 23 through suitable reduction gearing 23'. The carriage driving force of each motor may, of course, be applied to the wheels 16, if desired, rather than through a rack and pinion as shown. Obviously the pinion, motor, and reduction gearing of each gate mechanism may, if desired, be mounted in the carriage pit in position to drivingly engage a rack bar mounted on the carriage.

The entrance and exit gate mechanisms 9 and 9', of course, may be erected in any convenient adjacently disposed or widely spaced locations to control vehicle movement in entering or leaving the controlled zone or area. When in operation, each carriage will normally be held in vehicle receiving position, as at one side of its pit 18. When in such position, as shown more particularly in Figs. 1, 2, and 4 of the drawings, each carriage will be in vehicle receiving alinement with respect to its associated entrance road or ramp 19, which, if desired, may be defined between spaced guard rails, curbs, or fences. Obviously the entrance ramps 19 of the entrance and exit gate mechanisms, by suitable placement of the fence means 8, will be accessible, respectively, only from outside of and from within the controlled zone 7, while the exit ramps 20 of the entrance and exit mechanisms conversely will open, respectively, only within and outwardly of the controlled zone 7. When the carriages are in their vehicle receiving positions shown in Fig. 1, a vehicle may be delivered onto each platform respectively over the roads or ramps 19. Each gate apparatus may also include a substantial barrier structure 24 erected in position in alinement with the carriage platform 11 thereof at and outwardly of the end of said carriage platform which is opposite or remote from its associated entrance ramp, said barrier being designed to prevent removal of a vehicle from the carriage, at the end thereof opposite or remote from the entrance ramp, when the carriage is in vehicle receiving position. As a consequence, a vehicle delivered onto a carriage 10, over its associated entrance ramp 19 will be halted and entrapped on the carriage platform, by the barrier 24, when the carriage is in vehicle receiving position.

Each gate mechanism may be operatively connected with coin actuated mechanism 25 for controlling the operation of its carriage 10 in response to the deposition of coins, to a prescribed aggregate value, in the coin controlled mechanism. Each coin controlled mechanism 25 may be mounted in such position adjacent its associated carriage 10 that coins may be conveniently deposited therein by the operator of a vehicle in mounted position on the carriage. Means may be provided for actuating the carriage shifting motors 22 each respectively in response to the deposition of coins in its associated mechanism 25, to thereby cause the carriages 10 to shift from vehicle receiving to vehicle discharging position on the rails 17. The carriages 10, accordingly, with vehicles in place thereon, may be shifted each from its vehicle receiving position, in alinement with its associated ramp 19, into position in alinement with its assocated vehicle delivering ramp or road 20 which extends at the end of the pit 18 and alongside of the barrier 24 and remote from the entrance ramp 19. The delivery ramps 20, if desired, may be defined between suitable guard rails, curbs, or fences. Accordingly, when a carriage 10 is in vehicle discharging position, it will be offset with respect to its entrance ramp 19 as well as with respect to its associated barrier 24, so that a vehicle may be discharged from the carriage, over the discharge ramp or road 20, after which the driving motor 22 may be operated to return the carriage to its normal or vehicle receiving position in alinement with its associated entrance ramp 19 and vehicle trapping barrier 24.

In order to accomplish the foregoing sequence of operation in entirely automatic fashion, each motor 22 and its associated coin actuated mechanism 25 may be electrically interconnected respectively in a suitable electrical circuit system 26, 26'. Each of said systems may also include photocell devices 27 and 28 of the electric eye type, and cooperating exciter lamps 27E and 28E. The electrical systems 26, 26' may each be energized from a suitable electrical power source 29 through suitable disconnecting switch means 30 and a power supply circuit 31 adapted to be connected with and hence to supply power for the operation of a motor 22 from the power source when the switch means 30 is closed. Each circuit 31 may include any suitable or preferred overload protection means, such as fuses 32, and each circuit preferably embodies reversing means operable to drive its associated motor selectively in forward and in reverse direction of operation. To this end each power supply circuit 31 may embody a cooperating pair of branches 31F and 31R respectively adapted for driving the associated motor 22 forwardly and in reverse, the forward driving circuit branch 31F, to that end, containing forward driving switch means 33F, while the reverse driving circuit branch 31R contains reverse driving switch means 33R.

The switches 33F and 33R are normally open, whereby the motors 22 will be normally inactive. Closure of the switch 33F will energize the associated motor 22 for operation in the forward driving direction, while closure of the switch 33R will cause the associated motor 22 to operate in reverse. The switches 33F and 33R respectively have associated actuating coils 33FC and 33RC, each adapted, when electrically energized, to cause closure of its associated switch.

The electric eye devices 27 and 28 may each comprise a light-sensitive cell, a pair of device activating terminals $a$ and $b$ and three operating terminals $c$, $d$, and $e$. The electric eye devices 27 and 28 are adapted to operate in conjunction with their corresponding exciter lamps 27E and 28E which are disposed in position each to direct a beam of light upon the light-sensitive cell element of its associated eye device. Each eye device may be conditioned for operation by connection of its terminals $a$ and $b$ with a suitable source of electric power. When so conditioned, each eye device may function to create and maintain open circuit conditions, between its operating terminals $c$ and $d$, and closed circuit conditions, between its operating terminals $d$ and $e$, so long as a light beam, as from its cooperating exciter lamp, impinges upon its light-sensitive cell element. When and so long as the sensitive cell element of the electric eye device is screened against impingement of the exciting light beam, closed and open circuit conditions are instantly established and maintained respectively between the operating terminals $c$—$d$ and $d$—$e$ of the electric eye device.

The eye device 27 and its cooperating exciter lamp 27E is disposed in position guarding the entrance ramp 19 of the gate mechanisms with which the device 27 is associated. Accordingly, the actuating beam from the exciter lamp 27E will be interrupted when a vehicle is about to be delivered upon the carriage platform 11 of the associated gate mechanism, and will remain interrupted until the vehicle has been delivered entirely onto the carriage platform.

The electric eye device 28 and its cooperating exciter lamp 28E is disposed opposite the vehicle discharge end of the carriage 11 with which the device 28 is associated. The energizing light ray emitted by the lamp 28E will be prevented from impinging upon the light sensitive element of the associated electric eye device 28 as a vehicle is delivered on the carriage platform of the gate mechanism. The sensitive element of said eye device 28 will remain screened by the vehicle on the associated platform, so long as such vehicle remains on the platform, that is to say, while the platform is shifted to vehicle discharging or releasing position and until the vehicle is removed from the platform in shifted vehicle delivering position, impingement of the exciting light beam upon the electric eye device being restored as and when the vehicle moves from the platform. The electric eye devices, accordingly, may be employed to control the operation of the forward and reverse driving switches 33F and 33R, in accordance with the screened or unscreened condition of the associated eye devices. Operation of the forward and reverse driving switches of each gate mechanism may thus be controlled by the presence of a vehicle on the carriage platform thereof, and also by a vehicle as the same is delivered over the entrance ramp onto the platform of the gate mechanism. The switches 33F and 33R, accordingly, comprise load controlled switches, since they operate in response to the presence or absence of a vehicle as a load on the carriage 10.

Electrical power for operating the electric eye devices and their cooperating energizing lamps, as well as the coin box mechanism 25 and the several relay switches hereinafter more fully described, may be derived from the power source 29, preferably through a transformer 29′ having a primary winding connected with the power source as through suitable overload protection devices, such as fuses or the like, and the disconnecting switch means 30. One side of the secondary winding of the transformer 29 may be connected with common conductor means 34, while the other side of said secondary winding may be interconnected, as through fuses or other suitable overload protection devices 35 and disconnecting switches 36, with power supply conductor means 37.

The lamps 27E and 28E and the actuating terminals $a$ and $b$ of the electric eye devices 27 and 28 may be connected for operation between the supply conductors 34 and 37. One side of each of the coils 33FC and 33RC may be electrically connected with the common conductor 34. Consequently, the switches 33F and 33R may be closed to actuate the motor 22 by arranging to connect the common conductor remote ends of the coils 33FC and 33RC selectively with the power supply conductor 37. In accordance with the present invention, this is accomplished under the control of the electric eye and coin controlled devices.

The coin controlled devices 25 preferably comprise apparatus of conventional character, each preferably enclosed in a suitable, weather-proof housing having a coin receiving slot and a coin return pocket. As shown more especially in Fig. 6, the devices 25 may each embody connection terminals $a$, $b$, $c$, $d$, and $e$, and one or more normally open switches adapted to be closed, at least momentarily, in response to the deposition of a coin in the mechanism. In the illustrated embodiment, four separate, normally open, coin closable switches 38, 39, 40, and 41 are shown, said switches being adapted to be momentarily closed each in response to the deposition of a corresponding coin of desired denomination, as for example U.S. coins of five, ten, twenty-five and fifty cent values. The switches 38, 39, 40, and 41 are respectively connected in series with corresponding actuating coils 38′, 39′, 40′ and 41′. The coil remote sides of the switches 38, 39, 40, and 41 may be connected in common with the terminal $a$ of the device, and thence with the conductor 34, the switch remote ends of said coils being interconnected in common with the terminal $b$ of the device, and hence with the conductor 37. Each coin mechanism 25 also preferably embodies a normally open switch 42 adapted to be closed in response to the operation of the actuating coils 38′, 39′, 40′ and 41′, the switch 42 being electrically connected between the terminals $b$ and $c$ of the coin mechanism.

The coin actuated mechanism may also include conventional means operable to cause closure of the normally open switch 42 in response to the deposition of a selected number of coins of prescribed aggregate value in the mechanism. To such end, ratchet or other suitable progressively operable switch closing mechanism may be drivingly connected with the switch 42 and with the switch actuating coils 38′, 39′, 40′ and 41′, such operating mechanism being adapted to cause the switch 42 to close after selected ones of the coils have been energized each a predetermined number of times corresponding with the number and value of coins deposited in the mechanism. The mechanism thus may be arranged to cause closure of the switch 42 in response to the deposition of a required number of coins of requisite denomination to energize the coils, or at least one or more of them each a sufficient number of times to move the switch 42 from its normally open to its closed position. Obviously the apparatus may be arranged to close the switch 42 in response to the deposition of coins of any selected aggregate value; and, of course, the mechanism may be arranged to accept coins of any desired denomination. If desired, the mechanism may be arranged to accept only coins of a single size or denomination.

The coin controlled mechanism includes conventional coin reject means normally biased to prevent deposited coins from actuating the switches 38, 39, 40, and 41, such reject means serving to deliver deposited coins to the coin return pocket of the coin controlled mechanism. The apparatus also includes a reject control coil 43 electrically connected as between the terminals *a* and *d* of the mechanism. The reject control coil 43, when energized, serves to disable the reject mechanism, thereby allowing deposited coins to be accepted by the mechanism for the operation of the switches 38, 39, 40 and 41. The coin actuated mechanism may also include a resetting coil 44 connected as between the terminals *a* and *e* of the mechanism, said resetting coil serving, when energized, to open the switch 42 and to return the progressively operating switch closing means to retracted, starting or stand-by position.

The terminals *a* and *b* of the coin controlled devices 25 may be electrically connected respectively with the power conductors 34 and 37. The switch terminal *c* of each device 25 may be connected, in each circuit system 26, with the power supply conductor 34 through the operating coil 45C of a normally open double pole switch 45, adapted to close when and so long as the coil 45c is electrically energized through closure of the switch 42 of the associated coin controlled device 25.

The terminal *e* of each coin controlled device 25 may be connected with the power supply conductor 37 through a pole S–1 of the switch 45, whereby to actuate the reset coil 44 of the coin actuated mechanism whenever the switch S–1 is closed. The switch pole S–1 may also be connected with one of the operating coils 46FC of a selector switch 46 to interconnect said coil between the power supply conductors 34 and 37 through said switch S–1 whenever the same is closed. The selector switch 46 may comprise a pair of alternately closable switch elements 46FS and 46RS, and another operating coil 46RC, whereby the switch elements 46FS and 46RS may respectively be closed when the coils 46FC and 46RS are energized.

The coil 46RC, in each of the motor control systems 26, is interconnected in series with a corresponding normally open limit switch 47 to form a circuit extending between the power supply conductors 34 and 37, said normally open limit switch 47 being disposed in position to be closed by its associated vehicle carrying platform 10 when the same reaches relatively shifted vehicle discharging position in alinement with its associated exit ramp 20, to thereby allow the coil 46RC to be energized when the platform of the gate mechanism is in vehicle discharging position.

The switch 46FS, in each circuit system 26, is interconnected in series with the coil 33FC to form a series circuit extending between the power conductor 34 and the terminal *c* of the eye device 28. The switch 46RS, in each circuit system 26, is connected in series with the coil 33RC to form a series circuit extending between the power conductor 34 and the terminal *e* of the eye device 28, through a normally closed limit switch 47′ which is disposed in position to be opened by its associated vehicle carrying platform 10 when the same reaches vehicle receiving position in alinement with its associated entrance ramp 19, after being returned to such position from relatively shifted vehicle delivering position, the platform 10 serving to hold the limit switch 47′ in open position so long as the platform remains in normal vehicle receiving position.

The terminal *d* of the eye device 28, in each circuit system 26, is connected with the corresponding terminal *d* of the associated eye device 27. The terminal *e* of said device 27, in turn, is electrically connected with the power supply conductor 37 through normally closed safety switches 48 and 49, interconnected in series. These safety switches each have a corresponding actuating coil 48C and 49C interconnected respectively with the motor power supply circuit branches 31F and 31R. The safety switches 48 and 49, accordingly, may each open and remain open in the event and so long as overload conditions prevail in either of the power supply circuit branches 31F and 31R. As long as the motor energizing circuit branches are not electrically overloaded, the switches 48 and 49 will remain closed, and the circuit for operating the coils 33FC and 33RC will remain in operative condition, said circuit extending from the supply conductor means 37 through the switches 48 and 49, thence through the eye device 27 between the terminals *d* and *e* thereof to the terminal *d* of the eye device 28. When a vehicle is on the platform in position screening the device 28 from the light source 28E, the coil operating circuit may be completed through the terminals *c* and *d* of the device 28, thence through the switch 46FS, when closed, and the forward motor driving coil 33FC, to the power conductor 34, to thus drive the motor in a direction to project the platform from vehicle receiving to relatively shifted vehicle delivering position.

When, however, the light beam from the source 28E impinges upon the eye device 28, as when a vehicle has been removed from the platform in relatively shifted vehicle delivery position, the coil operating circuit may be completed through the terminals *d* and *e* of the device 28, the switches 47′ and 46RS, when closed, and the reverse motor drive coil 33RC, to the power conductor 34, in order thus to close the switch 33R to operate the motor 22 in reverse direction to return the carriage 10 to normal vehicle receiving position, such operating circuit remaining effective until broken by the opening of the limit switch 47′ by the carriage when the same reaches normal vehicle receiving position.

It will be seen that the circuit for closing the forward driving switch 33F will be inactive and inoperative in the event that the same be broken between the terminals *d* and *e* of the eye device 27. The circuit is maintained between the terminals *d* and *e* of the device 27 so long as the light ray from the lamp 27E continues to impinge upon the eye device 27; but the circuit will be broken when and so long as the light ray from the lamp 27E is prevented from reaching the eye device, as when a vehicle is driven upon the entrance ramp 19 in position to enter upon the platform 10 of the gate mechanism. The eye device 27 thus will prevent actuation of the associated motor 22 in the event that a vehicle is driven toward the platform 10 of the gate mechanism sufficiently to interrupt the light beam between the lamp 27E and the cooperating eye device 27; and the apparatus will remain in disabled condition until the beam interrupting vehicle shall have been driven entirely upon the platform 10, or otherwise withdrawn from beam interrupting position, to thereby reestablish impingement of the light beam upon the eye device 27. It is thus impossible to shift a platform 10 from its normal vehicle receiving position during the period while a vehicle is being delivered upon the platform, or in the event that the forward end only of a vehicle is disposed in position to interfere with the movement of the platform.

It will be seen that the circuit which controls the operation of the forward and reverse motor driving switches 33F and 33R also extends between the terminals *c* and *d* of the eye device 28 to control forward driving movement of the motor, and between the terminals *d* and *e* of the eye device to control reverse driving movement of the motor. The forward and reverse driving circuits will thus be respectively open and closed between the terminals *c*—*d* and *d*—*e* of the eye device 28 so long as the light beam emitted by the lamp 28E impinges upon the eye device 28. Accordingly, the forward driving circuit will be, and will remain, inoperative so long as there is no vehicle disposed upon the platform 10 of the gate device in position to screen the eye device 28 by interrupting the light beam emitted by the lamp 28E. The forward motor driving switch 33F thus can be closed to operate the motor 22 only when the light beam from the lamp 27E is applied upon the eye device 27, while the rays emitted by the lamp 28E are simultaneously screened from impingement on the eye device 28. When a vehicle is disposed upon the platform 10, however, such conditions are realized, so that deposition of coins to the required value in the coin mechanism 25 will complete an energizing circuit through the coil 45C and thereby close the switch 45. Closure of the switch 45, and more particularly the pole of S-1 thereof, will energize the coil 46FC to thereby actuate the switch means 46FS to close the forward driving switch 33F, and thus energize the motor 22 to move the platform 10 from normal vehicle receiving to relatively shifted vehicle discharging position. Of course as soon as the switch 45 is thus operated to energize the coil 46FC, it will also energize the reset coil 44 of the coin device, thereby opening the switch 42, deenergizing the coil 45C, and opening the switch 45. The switch 46, however, having been moved into position closing its switch element 46FS, will remain in such position to thereby maintain the energizing circuit through the coil 33FC in order to hold the forward motor driving switch 33F.

As soon as the platform 10 leaves its normal vehicle receiving position, the limit switch 47' will assume its normally closed position, thereby conditioning the reversing circuit through the coil 33RC for operation in response to closure of the switch 46RS. When the platform 10 reaches vehicle delivering position in alinement with the exit ramp 20, it causes the limit switch 47 to close, thereby energizing the coil 46RC to shift the switch 46 into position opening its element 46FS and closing the switch element 46RS. The reverse coil energizing circuit, through the reversing coil 33RC, however, will remain interrupted between the terminals d and e of the eye device 28 until the platform supported vehicle shall have been delivered from the platform, thereby restoring impingement of the light beam from the lamp 28E upon the eye device 28. As soon as such light beam restoration is accomplished, impingement of the beam from the light source 27E, being maintained upon the eye device 27, the reversing coil 33RC will become energized to close the reversing switch 33R to thereby drive the motor 22 in the direction required to return the platform carriage 10 from projected to normal vehicle receiving position; and the coil 33RC will remain energized to hold the switch 33R in closed position during carriage retracting movement and until the limit switch 47' is opened by the carriage as it reaches retracted vehicle receiving position.

The reject control coil 43 of the coin mechanism 25 is preferably connected, through the terminal d of the coin box, in parallel relationship with respect to the control switch 46FS and the actuating coil 33FC of the forward motor driving switch, that is to say, the coil 43 is connected in a circuit extending between the common conductor 34, with which the terminal a of the coin box mechanism is electrically connected, thence through the terminal d of the coin box mechanism to the energizing circuit of the coil 33FC, being connected with said circuit between the circuit controlling switch 46FS and the terminal c of the electric eye device 28. The energizing circuit of the reject control coil 43, accordingly, extends through the eye device 28 between the terminals c and d thereof, the eye device 27, between the terminals d and e thereof, and the safety switches 48 and 49 to the power conductor 27. As a consequence, the reject control coil 43 will be, and will remain, energized to thereby disable the reject mechanism and thus condition the coin box mechanism for operation only when a vehicle is disposed on the platform in position interrupting the light beam between the lamp 28E and the corresponding eye device 28, as the light beam from the lamp 27E is also simultaneously impinging upon the eye device 27. At all other times, the reject coil 43 will be deenergized, thereby rendering the coin box mechanism inoperative.

It is desirable, especially where the mechanism of the present invention is applied to control the entry and exit of vehicles to and from parking lots, to maintain a continuous count of the number of vehicles occupying the guarded parking lot, and to provide means for preventing the entrance of vehicles into the lot when the same contains a predetermined desired maximum number of vehicles. To this end the apparatus may include counting means comprising a movable member 50 adapted to be driven progressively in one direction in response to the entrance of vehicles through the entry gate mechanism 9, and in the reverse direction in response to the delivery of vehicles through the exit gate mechanism 9'. As shown, the movable member 50 may comprise a turntable wheel and associated step-by-step driving means actuated by a coil 51 for turning the wheel 50 in one direction through a selected displacement each time the gate mechanism 9 is operated to deliver a vehicle therethrough, an actuating coil 51' being provided to reversely turn the wheel 50 through a like displacement each time the exit gate mechanism 9' is operated to deliver a vehicle therethrough. The coils 51 and 51', as shown, may be connected between the conductor means 34 and 37 each in series with the pole S-2 of a corresponding one of the switches 45, whereby the coil 51 will be energized each time the switch means 45 of the system 26 is closed, as the result of the delivery of a vehicle through the entrance gate mechanism 9, while the coil 51' will be energized in response to the closure of the switch means 45 of the system 26' as the result of vehicle delivery through the exit gate mechanism 9'.

The wheel 50 may be connected to drive visual indicator means adapted to show the number of vehicles occupying the parking lot controlled by the entrance and exit gate mechanisms. Preferably the wheel 50 is provided with a switch actuating finger so disposed as to operate suitable switch means 52 when the number of vehicles in the parking lot guarded by the gate mechanism reaches a selected maximum, in order to indicate the filled condition of the parking lot and to prevent entrance of additional vehicles into the lot until one or more of the vehicles therein shall have been removed therefrom through the exit gate mechanism.

As shown, the switch means 52 may comprise a normally open switch 53 and a normally closed switch 54 adapted respectively to be closed and opened by operation of the actuating finger of the wheel 50 when the same reaches an advanced position corresponding with a selected maximum number of vehicles in situ within the parking lot guarded by the gate mechanism. The normally closed switch 54 may be included in series connection with the reject control coil 43 of the coin box mechanism 25 of the entrance gate mechanism 9, to deenergize said reject control coil and thereby render the coin box 27 inoperative in response to the opening of switch 54 when the parking lot guarded by the gate mechanism reaches a predetermined filled condition.

The normally open switch 53 may be connected in series with a signal lamp 55 or other preferred signalling device or relay means to form a circuit between the conductors 34 and 37, whereby to energize the signalling or relay means when the parking lot guarded by the gate mechanism reaches a predetermined filled condition. Such signalling means, for example, may comprise a normally invisible sign adapted to be illuminated in response to closure of the switch 53 in order to announce the full condition of the parking lot. If desired, the switch 53 may be employed to control relay switch means adapted to accomplish the closure of normally open gate means disposed at the entrance ramp 19 to thereby bar access to the gate mechanism 9 whenever the counter 50 indicates that the parking lot or other area guarded by the gate mechanism is full.

If desired, a total count device 56, having an operating coil 57, may be provided to indicate the total number of vehicles transferred through the entrance gate mechanism 9 during the service life of the apparatus or during any other extended operating interval, the operating coil 57 being connected in parallel with the forward driving coil 51 of the counting device. So connected, the coil 57 will be energized to actuate the counter 56 each time the switch means 45 is closed in response to the delivery of a vehicle through the entrance gate mechanism 9.

If it be desired to provide for the operation of either or both of the gate mechanisms without requiring the deposition of coins, the coin collection mechanism 25 may be omitted and a normally open push button switch may be connected in series with the coil 45C in place of the coin box switch 42.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

This application is a continuation-in-part of application Serial No. 233,967, filed by me on June 28, 1951, and entitled "Automatic Parking Lot," now abandoned.

I claim:

Barrier gate mechanism for controlling access to and egress from a delimited zone comprising separate entrance and exit carriages each movable from load receiving to load discharging position and back to load receiving position, said entrance and exit carriages, when in load receiving position, being accessible respectively from outside of and from within said delimited zone for the delivery of a load object thereon, said carriages, when in load discharging position, being disposed in position to release a load object thereon for delivery respectively into and outwardly of said zone, normally inactive driving means for each of said carriages, control means for actuating each of said driving means, to move the associated carriage in one direction from load receiving to load discharging position, when a load object is mounted thereon, means to disable said driving means when the carriage reaches load discharging position, monitor means, operable in response to the removal of a load object from the carriage when the same is in load discharging position, for actuating said driving means to return the carriage in the opposite direction to load receiving position, means to disable said driving means when said carriage reaches its load receiving position, counting means embodying a progressively operating wheel, means to move the same progressively in one direction in response to operation of the entrance carriage, means to move said wheel progressively in the opposite direction in response to operation of the exit carriage, switch means operated by said wheel when said delimited zone contains a predetermined maximum number of load objects therein, and operating means controlled by said switch for preventing access to or operation of said entrance carriage.

References Cited in the file of this patent

UNITED STATES PATENTS

| | | |
|---|---|---|
| 1,189,708 | Logan | July 14, 1916 |
| 1,706,211 | Coffey | Mar. 19, 1929 |
| 1,911,015 | Crabbe et al. | May 23, 1933 |
| 2,073,834 | Duany | Mar. 16, 1937 |
| 2,094,216 | Hunter | Sept. 28, 1937 |
| 2,321,253 | Schellentrager | June 4, 1943 |
| 2,483,817 | Ehinger | Oct. 4, 1949 |
| 2,605,911 | Medway | Aug. 5, 1952 |
| 2,626,718 | Weber | Jan. 27, 1953 |
| 2,696,921 | Desjardins | Dec. 14, 1954 |